United States Patent [19]

Carlson et al.

[11] 3,834,464

[45] Sept. 10, 1974

[54] AERATING MACHINE

[75] Inventors: Carl H. Carlson, St. Paul; Frank A. Slaker, New Brighton, both of Minn.

[73] Assignee: Outboard Marine Corporation, Waukegan, Ill.

[22] Filed: Feb. 27, 1973

[21] Appl. No.: 336,381

[52] U.S. Cl.................... 172/22, 172/125, 192/48.9
[51] Int. Cl............................................ A01b 45/02
[58] Field of Search......... 172/21, 22, 103, 125, 95; 192/48.9, 48.7; 74/125.5

[56] References Cited
UNITED STATES PATENTS

| | | | |
|---|---|---|---|
| 2,800,066 | 7/1957 | Cohrs et al. ........................... | 172/22 |
| 3,429,378 | 2/1969 | Mascaro ............................... | 172/22 |

*Primary Examiner*—Stephen C. Pellegrino
*Attorney, Agent, or Firm*—Michael, Best & Friedrich

[57] ABSTRACT

Disclosed herein is an aerating machine including a frame supported on a pair of ground-engaging wheels, a drive shaft which is selectively and rotatably driven by an engine, a crankshaft which is operably connected to and vertically reciprocates a plurality of turf-perforating tines, and a camshaft which is operably connected to the tines to provide synchronized movement thereto so that the tines are maintained in stationary horizontal position relative to the ground during aeration. The wheels, the crankshaft, and the camshaft are selectively driven by the drive shaft through chain and sprocket drives which are actuated by clutches located on the drive shaft and the camshaft. The operation of the clutches is controlled by a single control lever which pivotally mounted on the frame for movement between spaced positions corresponding to different modes of machine operation and which is operably connected to the clutches by a linkage which is arranged to coordinate the engagement and disengagement of the clutches in response to pivotal movement of the single control lever between the various operating mode operations.

11 Claims, 6 Drawing Figures

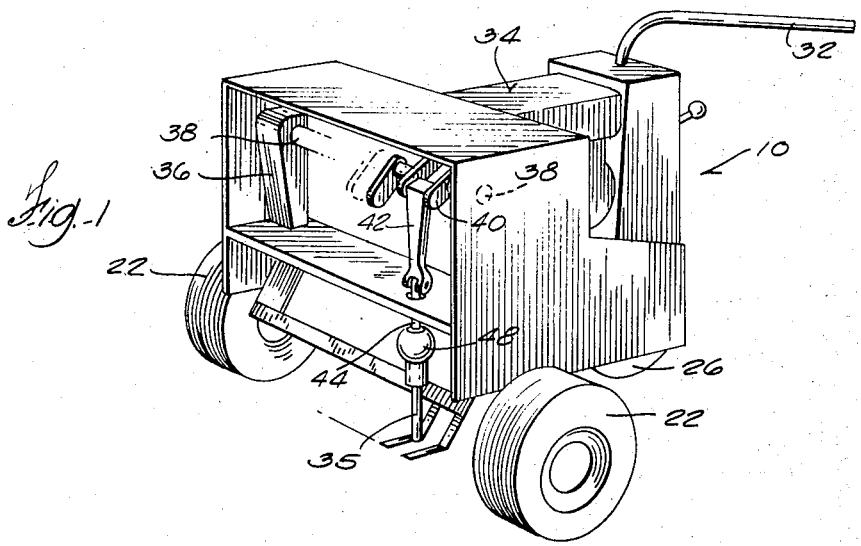
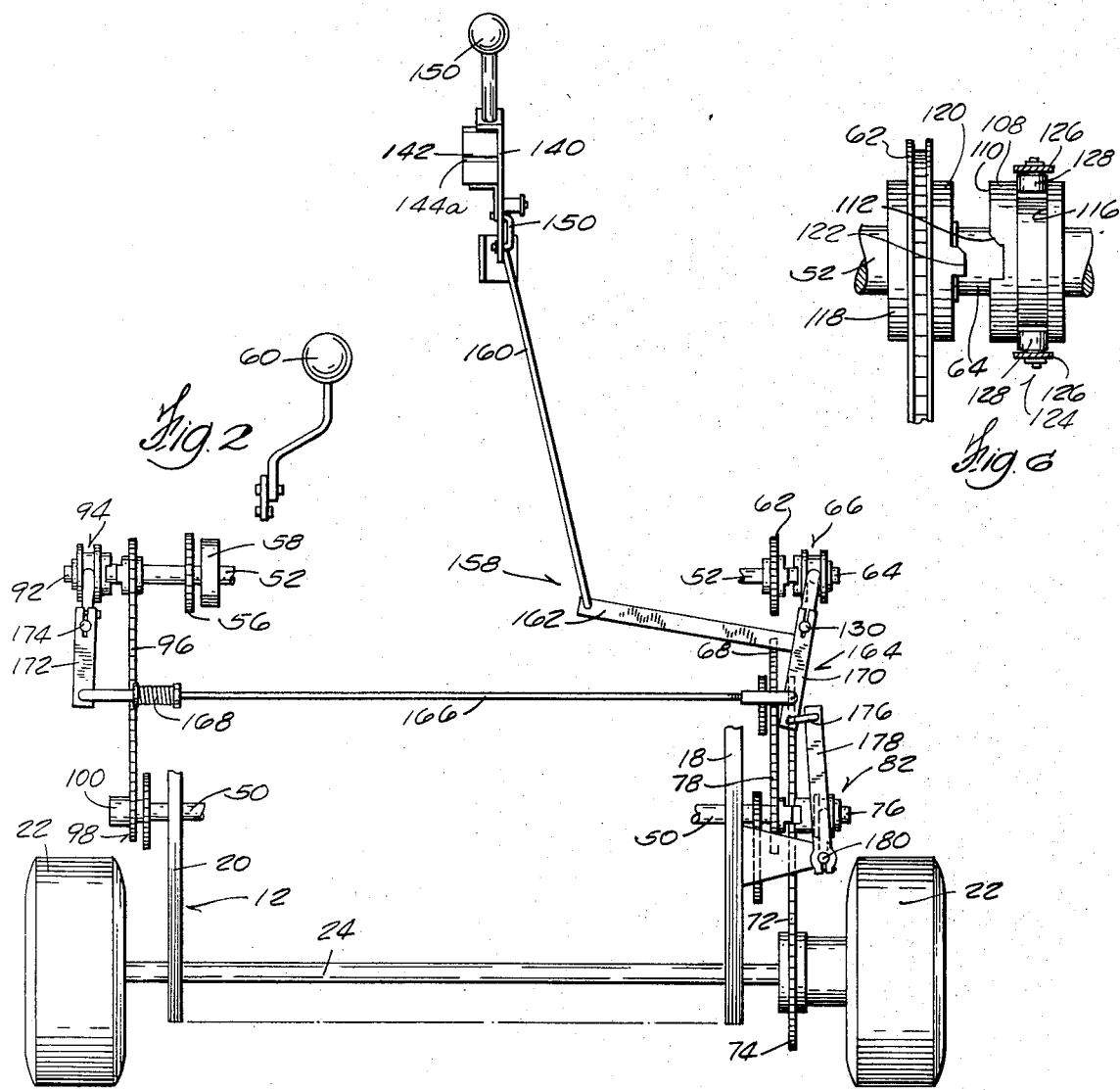

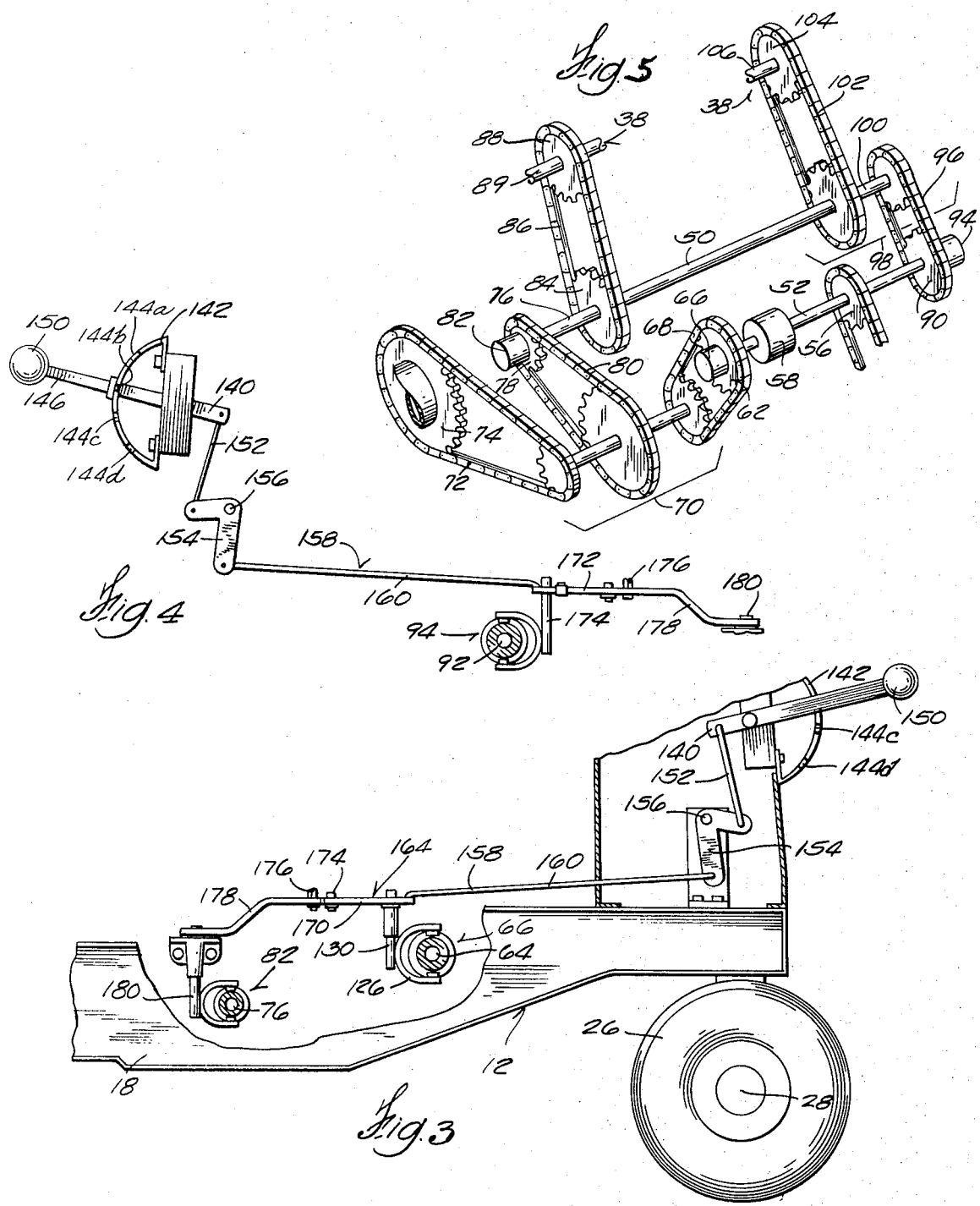

3,834,464

AERATING MACHINE

BACKGROUND OF THE INVENTION

Aerating machines which perforate turf to permit aeration of the soil and admission of moisture to the roots of the grass are used where more durable turf is desired, such as golf course greens. These machines typically employ a single power source, such as an internal combustion engine, to drive machine-supporting wheels for movement of the machine, to drive a crankshaft which reciprocates the turf perforating punches or tines, and to drive a camshaft which provides synchronized horizontal movement of the vertically reciprocating punches or tines so they are retained in a horizontally stationary position relative to the ground as the machine travels over the ground during the aerating operation. In prior art machines, such as the one described in U.S. Pat. No. 2,800,066, (Cohrs et al), issued July 23, 1957, a plurality of control levers and clutch mechanisms have been used to selectively connect the wheels, the crankshaft, and the camshaft with the engine to obtain the desired operation.

Filed herewith with the U.S. Patent Office is a copy of a parts list of one prior art aerating machine manufactured by the assignee of this application.

SUMMARY OF THE INVENTION

This invention provides an aerating machine which is arranged so that the operation of the wheels and the turf-perforating punches or tines is selectively controlled by a single control lever.

More specifically, the aerating machine provided by the invention includes a frame supported on a pair of ground-engaging wheels, a drive shaft journaled on the frame and adapted to be driven by a power source, a crankshaft which is operably connected to and vertically reciprocates a plurality of turf-perforating punches or tines, a first clutch for selectively engaging and disengaging the drive shaft to and from the wheels, a second clutch for selectively engaging and disengaging the drive shaft to and from the crankshaft, and a third clutch for selectively engaging and disengaging the drive shaft to and from the wheels through the second clutch. The operation of the clutches is controlled by means mounted on the frame including a single control lever which has four spaced positions such that, when the control lever is in a first position, the first clutch means is engaged, the second and third clutches are disengaged, and the machine is in a transport mode with only the wheels being driven. When the control lever is in a second position, all the clutches are disengaged and the machine is in a neutral mode. When the control lever is in a third position, the first and second clutches are engaged and the machine is in a tines only mode with only the tines being driven. When the control lever is in a fourth position, the second and third clutches are engaged and the machine is in an aerating mode with both the wheels and the tines being driven.

In a preferred embodiment, the control lever is operably connected to the clutches by a linkage arrangement which is interconnected in a manner so as to coordinate the operation of the clutches in response to movement of the control lever.

An object of this invention is to provide an aerating machine which is arranged so that the operation of the wheels and the ground-perforating punches or tines is selectively controlled by a single control lever.

Other objects and advantages of the invention will become apparent upon reviewing the following description and the accompanying drawings.

BRIEF DESCRIPTION OF THE DRAWINGS

FIG. 1 is a perspective view of an aeration machine in accordance with the invention.

FIG. 2 is a fragmentary, plan view of the clutch control mechanism incorporated in the aerating machine shown in FIG. 1.

FIG. 3 is a fragmentary, right side elevational view, partially in section, of the clutch control mechanism of FIG. 2.

FIG. 4 is a fragmentary, left side elevational view, partially in section, of the clutch control mechanism of FIG. 2.

FIG. 5 is a diagrammatic representation of the drive mechanism incorporated in the aerating machine shown in FIG. 1.

FIG. 6 is an enlarged, exploded view of one of the clutches.

DESCRIPTION OF THE PREFERRED EMBODIMENT

Before explaining the invention in detail, it is to be understood that the invention is not limited in its application to the details of the construction and arrangement of the components set forth in the following description or illustrated in the drawings. The invention is capable of other embodiments and being practiced and carried out in various ways. Also, it is to be understood that the phraseology or terminology employed herein is for the purpose of description and should not be regarded as limiting.

The drawings illustrate an aerating machine 10 comprising a frame 12 including a pair of transversely spaced, longitudinally extending frame members 18, 20. The frame 12 is supported on a pair of transversely-spaced, ground-engaging rear wheels 22 which are mounted for common rotary movement on a rear axle 24 extending between and suitably journaled on the rear portion of the frame members 18 and 20. The frame 12 is also supported on a pair of ground-engaging, front wheels 26 (one shown) which are rotatably mounted on a front axle assembly 28 which is mounted on the front portion of the frame 12 for rotation about a vertical turning axis. The aerating machine 10 can be guided for travel over the ground by a handle 32 suitably connected to the front axle assembly 28. Supported on the frame 12 is an internal combustion engine 34 which, through a suitable drive arrangement, powers the rear wheels 22 and also drives a plurality of turf-perforating punches or tines 35 (one shown) as described below.

Extending upwardly from the rear portion of the frame 12 is an upstanding frame structure 36. Suitably journaled on the upstanding frame structure 36 is a transverse crankshaft 38 including a plurality of crank arms 40 (one shown). Connecting rods 42 (one shown) are pivotally connected, at the upper end, to each of the crank arms 40. The lower ends of the connecting rods 42 are pivotally connected to respective push rods 44 (one shown) carrying one of the tines 35 which are hollow and downwardly tapered and which are reciprocated in response to rotation of the crankshaft 38 to penetrate the ground.

The push rods 44 are slidably mounted in respective transversely-spaced guide sleeves 48 (one shown) for reciprocative movement therein. Each of the guide sleeves 48 is operably connected to a cam actuated mechanism (not shown) which is driven by a transverse camshaft 50 extending between and suitably journaled on the frame members 18 and 20 and which imparts a horizontally reciprocative movement to the guide sleeves 48, and thus to the tines 35.

The cam actuated mechanism is constructed in a conventional manner and imparts a horizontal reciprocative movement to the guide sleeves 48 which is synchronized with the vertical reciprocative movement produced by the crankshaft 38 and with the forward driving speed of the aerating machine 10 so that, when the tines 35 are in a ground penetrating position, the tines 35 are moved rearwardly at exactly the same speed as the forward traveling speed of the machine. Thus, the tines 35 are maintained in a horizontally stationary position relative to the ground during penetration as the aerating machine is traveling over the ground. The aforementioned U.S. Pat. (Cohrs et al.) No. 2,880,066 describes a cam actuated mechanism suitable for this purpose, which patent is incorporated herein by reference.

Suitable drive means are provided for driving the rear wheels 22, the crankshaft 38, and the camshaft 50. While various arrangements can be used, in the construction illustrated, such means includes a drive shaft 52 suitably journaled on the forward portion of the frame 12 and a chain and drive sprocket (not shown) which is operably connected to the engine 34 and drives a drive sprocket 56 rotatably mounted on the drive shaft 52. The drive sprocket 56 is operably connected to a master clutch 58 (shown diagrammatically) which is mounted on the drive shaft 52 and which, when shifted to a drive position, forms a positive drive connection between the drive sprocket 56 and the drive shaft 52. The master clutch 58 is shifted to a drive position by a control lever 60. The master clutch 58 can be of any conventional design, such as a friction disc clutch.

For driving the rear wheels 22, there is provided a sprocket 62 which is rotatably mounted on the outer end portion 64 of the drive shaft 52 and which, when releasably engaged by a first drive shaft clutch 66 mounted on the drive shaft 52, drives a chain 68 which in turn drives a triplex sprocket 70 rotatably mounted on the frame 12. As shown in FIGS. 2 and 6, the triplex sprocket 70, when being driven, drives the rear wheels via a chain 72 and a sprocket 74 affixed to the rear wheel axle 24. The triplex sprocket 70 is shown exploded in FIG. 6 for clarity; however, in actual practice it is a unitary assembly.

Rotatably mounted on the outer end portion 76 of the camshaft 50 is a sprocket 78 which is drivingly connected to the triplex sprocket 70 by a chain 80. When releasably engaged by a camshaft clutch 82 mounted on the camshaft 50, the sprocket 78 is driven by the camshaft 50 and in turn drives the triplex sprocket 70 via the chain 80. Thus, the rear wheels 22 are driven by the triplex sprocket 70 when either the first drive shaft clutch 66 or the camshaft clutch 82 is engaged.

A sprocket 84 is fixably mounted on the camshaft 50 adjacent to the sprocket 78 and, when rotated by the camshaft 50, drives the crankshaft 38 via a chain 86 and a sprocket 88 affixed to the outer end portion 89 of the crankshaft 38.

For driving the camshaft 50, there is provided a sprocket 90 which is rotatably mounted on the opposite outer end portion 92 of the drive shaft 52 and which, when releasably engaged by a second drive shaft clutch 94 mounted on the drive shaft 52, drives a chain 96 which in turn drives the camshaft 50 via a duplex sprocket 98 mounted on the opposite outer end portion 100 of the camshaft 50. As shown in FIG. 6, the duplex sprocket 98, when being driven by the chain 96, drives the crankshaft 38 via a chain 102 and a sprocket 104 affixed on the opposite outer end portion 106 of the crankshaft 38. The duplex sprocket 98 is shown exploded in FIG. 6 for clarity; however, in actual practice it is a unitary assembly. Thus, both ends of the crankshaft 38 is driven by the camshaft 50 via the sprockets 88 and 104 when the second drive shaft clutch 94 is engaged.

Conventional drive means other than sprocket and chains can be used to drive the rear wheels 22, the crankshaft 38 and the camshaft 50, such as a pulley and belt arrangement.

From the above description, it can be seen that the aerating machine 10 is in a "neutral" mode, i.e., the rear wheels 22, the crankshaft 38 and the camshaft 50 are inoperative, when all the clutches 66, 82, and 94 are disengaged from the respective sprockets 62, 78 and 90. The aerating machine 10 is in a "transport" mode, with only the rear wheels being 22 driven via the triplex sprocket 70 and the wheel drive sprocket 74, when the first drive shaft clutch 66 is engaged with the sprocket 62 and the camshaft clutch 82 and the second drive shaft clutch 94 are disengaged. The aerating machine 10 is in a "tines only" mode, with the tines 35 being driven by the camshaft 50 and the crankshaft 38 via the sprockets 84, 88, 98 and 104, when the second drive shaft clutch 94 is engaged with the sprocket 90 and the first drive shaft clutch 66 and the camshaft clutch 82 are disengaged. The aerating machine 10 is in an "aerate" mode, with the tines 35 being driven by the camshaft 50 and the crankshaft 38 as just described and the rear wheels 22 being driven via the triplex sprocket 70 when the second drive shaft clutch 94 and the camshaft clutch 82 are engaged and the first drive shaft clutch 66 is disengaged.

Clutches 68, 82 and 94 can be of various arrangements. In the construction illustrated, all the clutches are similarly arranged and operate in substantially the same manner. Therefore, only the first drive shaft clutch 66 will be described in detail. Referring to FIG. 5 the clutch 66 comprises a circular plate member 108 which includes an inner driving face 110 having one or more notches 112 (one shown), a central hub (not shown) slidably received on the outer end portion 64 of the drive shaft 52, and a peripheral groove 116. The sprocket 62 rides against a shoulder or stop 118 on the drive shaft 52 and includes an outer driving face 120 having cogs 122 (one shown) which mate with the notches 112 of the plate member 108.

The plate member 108 is moved axially along the drive shaft 52 into and out of engagement with the sprocket driving face 120 by a shift mechanism 124 including a U-shaped pivot arm 126 partially encircling the plate member 108 and having opposed projections 128 which ride in the peripheral groove 116. Affixed to and extending from the pivot arm 126 is a vertical shaft 130 which is rotatably mounted on the frame 12 in a suitable manner so that, in response to rotation of the shaft 130, the pivot arm 126 is pivoted to thereby move the plate member 108 relative to the sprocket driving face 120. When the plate member 108 is in a retracted or disengaged position, i.e., axially spaced from the sprocket driving face 120, the plate member 108 and the drive shaft 52 are free wheeling with respect to the sprocket 62. When the plate member 108 is moved in engagement with the sprocket driving face 120 by rotating the shaft 130, the notches 112 mesh with the cogs 122 and the sprocket 62 is driven by the plate 108 at the same rotational speed as the drive shaft 52.

In accordance with the invention, a control means is provided whereby the engagement and disengagement of the clutches 66, 82, and 94 with their respective sprockets 62, 78, and 90 is selectively controlled by the single control lever. While various arrangements can be used, in the construction illustrated such means includes a single control lever 140 which is pivotally mounted on the frame 12 for movement in a single plane, an arcuate selector bracket 142 having four equally spaced apertures 144a, 144b, 144c, and 144d respectively corresponding to the "transport," "neutral," "tine only," and "aerate" modes of the clutches as described above, and a spring-loaded detent 146 which is connected to the outer end of the control lever 140 and which is urged into the selector bracket apertures by a spring (not shown). A knob 150 connected to the outer end of the detent 146 is pulled outwardly to overcome the biasing force of the spring to release the detent 146 from the selector bracket apertures so that the control lever 142 can be pivoted to different machine operating mode positions.

Connected to the single control lever 140 are means for controlling the operation of the clutches 66, 82 and 94 including a link 152 interconnecting the inner end of the control lever 140 to one end of a bell crank 154 which, at the midpoint, is pivotally mounted by a pivot means 156 to the frame 12 and which at the other end is connected to the clutches 66, 82, and 94 for control thereof by means of a linkage arrangement 158.

More specifically, as best shown in FIG. 2, the linkage arrangement 158 comprises a first connecting link 160 pivotally connected between the bell crank 154 and one leg 162 of a generally L-shaped, first actuator lever 164 which is rigidly connected at an intermediate point to the pivot arm shaft 130 on the first drive shaft clutch 66 for operating the first drive shaft clutch 66 in response to movement of the control lever 140. For operating of the second drive shaft clutch 94 in response to movement of the control lever 140, a second connecting link 166 including a lost motion coupling in the form of a tension spring 168 is pivotally connected between the other arm 170 of the first actuator lever 164 and a second actuator lever 172 which is rigidly connected to the pivot arm shaft 174 of the second drive shaft clutch 94.

For operating the camshaft clutch 82 in response to movement of the control lever 140, a third connecting link 176 is pivotally connected between the arm 170 of the first actuator lever 164 and a third actuator lever 178 which is rigidly connected to the pivot arm shaft 180 on the camshaft clutch 82.

In FIGS. 2–4, the control lever 140 and the linkage arrangement 158 are shown in a neutral position with all the clutches 66, 82, and 94 disengaged. In operation, when the control lever 140 is moved from the "neutral" position to the "transport" position, moved upwardly as viewed in FIG. 4 to a position where the detent 146 is urged into the selector bracket aperture 144a, the bell crank 154 is moved in a counterclockwise direction about the pivot 156 and the first actuator lever 164 is moved, via the first connecting link 160, in a counterclockwise direction as viewed in FIG. 2. The pivot arm shaft 130 on the first drive shaft clutch 66 is rotated counterclockwise so that the drive shaft clutch 66 engages the sprocket 62 and the rear wheels 22 are driven by the drive shaft 52 via the sprocket 62, the triplex sprocket 70 and the wheel drive sprocket 74 as described above. At the same time, the pivot arm shaft 174 on the second drive shaft clutch 94 is rotated counterclockwise, via the second connecting link 166 and the second actuator lever 172, and the pivot arm shaft 180 on the camshaft clutch 82 is rotated clockwise, via the third connecting link 176 and the third actuator lever 178 to further disengage the second drive shaft clutch 94 and the camshaft clutch 82 from their respective sprockets.

When the control lever 140 is moved to the "tines only" position, i.e., moved downwardly as viewed in FIG. 4 to a position where the detent 146 is urged into the selector bracket aperture 144c, the bell crank 154 is moved in a clockwise position about the pivot 156 and the first actuator lever 164 is moved in a clockwise direction with respect to the pivot arm shaft 130 on the first drive shaft clutch 66. Thus, the pivot arm shaft 130 is rotated clockwise by the first actuator lever 164 to thereby disengage the first drive shaft clutch 66 from the sprocket 62 and the pivot arm shaft 174 is rotated clockwise, via the second connecting link 166 and the second actuator lever 172, to drivingly engage the second drive shaft clutch 94 with the sprocket 90 so that crankshaft 38 and the camshaft 50 are driven thereby as described above. At the same time the pivot arm shaft 180 is rotated clockwise by the third actuator lever 178 to move the camshaft clutch 82 towards, but not into driving engagement with, the sprocket 78.

When the control lever 140 is moved to the "aerate" position, i.e., moved further downwardly as viewed in FIG. 4 to a position where the detent 146 is urged into the selector bracket aperture 144d, the bell crank 154 is moved further in the clockwise direction about the pivot 156 and the pivot arm shaft 130 is rotated clockwise by the first actuator lever 164 to further disengage the first drive shaft clutch 66 from the sprocket 62. At the same time, the first actuator lever 164 moves the third actuator lever 178 clockwise, via the third connecting link 176, and the pivot arm shaft 180 is rotated counterclockwise to thereby engage the camshaft clutch 82 with the sprocket 98 so that the rear wheels 22 are driven by the camshaft 50 via the sprocket 78 the triplex sprocket 70 and the wheel drive sprocket 74 as described above. Motion imparted to the second connecting link 166 by the first actuator lever 164 is absorbed by tension spring 168 and the pivot arm shaft 174 is not moved.

Various features of the invention are set forth in the following claims.

We claim:

1. An aerating machine comprising a frame, a pair of ground-engaging wheel supporting said frame, a drive shaft journaled on said frame and adapted to be rotated by a source of power, a plurality of tines movably mounted on said frame, a crankshaft mounted on said frame and operably connected to said tines for driving said tines in response to rotation of said crankshaft, a first clutch connected between said drive shaft and said wheels for selectively engaging and disengaging said drive shaft to and from said wheels, a second clutch connected between said drive shaft and said crankshaft for selectively engaging and disengaging said drive shaft to and from said crankshaft, a third clutch connected between said drive shaft and said wheels for selectively engaging and disengaging said drive shaft to and from said wheels through said second clutch, and means mounted on said frame and connected to said first, second and third clutches and including a single control lever for selectively controlling the operation of said first, second and third clutches and having first, second, third and fourth spaced positions such that said first clutch is engaged and said second and third clutches are disengaged when said control lever is in said first position, such that said first, second, and third clutches are disengaged when said lever is in said second position, such that said second clutch is engaged and said first and third clutches are disengaged when said control lever is in said third position, and such that said second and third clutches are engaged and said first clutch is disengaged when said lever is in said fourth position.

2. An aerating machine according to claim 1 including a camshaft journaled on said frame and operably connected to said tines for moving said tines horizontally in response to rotation of said camshaft, and wherein said first and second clutches are operably connected to said drive shaft and said third clutch is operably connected to said camshaft.

3. An aerating machine according to claim 2 including first intermediate drive means, first drive means operably connected to said drive shaft adjacent to said first clutch and which, when engaged by said first clutch, drives said wheels through said first intermediate drive means in response to rotation of said drive shaft, second intermediate drive means, second drive means operably connected to said drive shaft adjacent to said second clutch and which, when engaged by said second clutch, drives said camshaft and said crankshaft through said second intermediate drive means in response to rotation of said drive shaft, and third drive means operably connected to said camshaft adjacent to said third clutch and which, when engaged by said third clutch, drives said wheels through said first intermediate means in response to rotation of said drive shaft and said camshaft.

4. An aerating machine according to claim 3 wherein said first intermediate drive means includes a first drive wheel means rotatably mounted on said frame and means for drivingly connecting said first drive wheel means with said wheels, said first drive means includes a second drive wheel means rotatably mounted on said drive shaft adjacent to said first clutch, means for drivingly engaging said first clutch with said second drive wheel means, and means drivingly connecting said second drive wheel means with said first drive wheel means when said first clutch is engaged with said second drive wheel means, said second intermediate drive means includes a third drive wheel means connected to said camshaft and means for drivingly connecting said third drive wheel means with said camshaft, said second drive means includes a fourth drive wheel means rotatably mounted on said drive shaft adjacent to said second clutch, means for drivingly engaging said second clutch with said fourth drive wheel means, and means for drivingly connecting said fourth drive wheel means with said third drive wheel means when said second clutch is engaged with said fourth drive wheel means, and said third drive means includes a fifth drive wheel means rotatably mounted on said camshaft adjacent to said third clutch, means for drivingly engaging said third clutch with said fifth drive wheel means, and means for drivingly connecting said fifth drive wheel means to said first drive wheel means when said third clutch is engaged with said fifth drive wheel means.

5. An aerating machine according to claim 4 wherein said first, second, third, fourth, and fifth drive wheel means are sprockets and all of said driving connection means are chains.

6. An aerating machine according to claim 1 wherein said control means includes means for pivotally mounting said control lever on said frame for movement between said first, second, third, and fourth positions, and linkage means interconnecting the control lever with said first, second, and third clutches for selective and coordinated operation of said clutches in response to movement of said lever.

7. An aerating machine according to claim 6 wherein said linkage means includes first, second, and third actuator levers respectively and operably connected to said first, second, and third clutches for controlling the operation of said clutches, a bell crank pivotally mounted on said frame and pivotally connected at one end to said control lever, a first link connecting the other end of said bell crank to said first actuator lever, means pivotally connecting said first link with said first actuator lever, a second link connecting said first actuator lever with said second actuator lever, said second link including a lost motion connection, means pivotally connecting said second link with said first actuator lever and with said second actuator lever, a third link connecting said first actuator lever to said third actuator lever, and means pivotally connecting said third link with said actuator lever and with said third actuator lever.

8. An aerating machine comprising a frame, a pair of ground-engaging wheels supporting said frame, a drive shaft journaled on said frame and adapted to be rotated by a source of power, a plurality of tines movably mounted on said frame, a crankshaft mounted on said frame and operably connected to said tines for driving said tines in response to rotation of said crankshaft, a camshaft journaled on said frame and operably connected to said tines for moving said tines horizontally in response to rotation of said camshaft, a first clutch operably connected between said drive shaft and said wheels for selectively engaging and disengaging said drive shaft to and from said wheels, a second clutch operably connected between said drive shaft and each of said crankshaft and said camshaft for selectively engaging and disengaging said drive shaft to and from said crankshaft and said camshaft, a third clutch operably connected between said camshaft and said wheels for selectively engaging and disengaging said drive shaft to and from said wheels through said second clutch, first intermediate drive means, first drive means operably connected to said drive shaft adjacent to said first clutch and which, when engaged by said first clutch, drives said wheels through said first intermediate drive means in response to rotation of said drive shaft, second intermediate drive means, second drive means operably connected to said drive shaft adjacent to said second clutch and which, when engaged by said second clutch, drives said camshaft and said crankshaft through said second intermediate drive means in response to rotation of said drive shaft, third drive means operably connected to said camshaft adjacent to said third clutch and which, when engaged by said third clutch, drives said wheels through said first intermediate means in response to rotation of said drive shaft and said camshaft, and means mounted on said frame and connected to said first, second, and third clutches and including a single control lever for selectively controlling the operation of said first, second and third clutches and having first, second, third and fourth spaced positions such that said first clutch is engaged and said second and third clutches are disengaged when said control lever is in said first position, such that said first, second, and third clutches are disengaged when said lever is in said second position, such that said second clutch is engaged and said first and third clutches are disengaged when said control lever is in said third position, and such that said second and third clutches are engaged and said first clutch is disengaged when said lever is in said fourth position.

9. An aerating machine according to claim 8 wherein said first intermediate drive means includes a first drive wheel means rotatably mounted on said frame and means for drivingly connecting said first drive wheel means with said wheels, said first drive means includes a second drive wheel means rotatably mounted on said drive shaft adjacent to said first clutch, means for drivingly engaging said first clutch with said second drive wheel means, and means drivingly connecting said second drive wheel means with said first drive wheel means when said first clutch is engaged with said second drive wheel means, said second intermediate drive means includes a third drive wheel means connected to said camshaft and means for drivingly connecting said third drive wheel means with said camshaft, second drive means includes a fourth drive wheel means rotatably mounted on said drive shaft adjacent to said second clutch, means for drivingly engaging said second clutch with said fourth drive wheel means, and means for drivingly connecting said fourth drive wheel means with said third drive wheel means when said second clutch is engaged with said fourth drive wheel means, and said third drive means includes a fifth drive wheel means rotatably mounted on said camshaft adjacent to said third clutch, means for drivingly engaging said third clutch with said fifth drive wheel means, and means for drivingly connecting said fifth drive wheel means to said first drive wheel means when said third clutch is engaged with said fifth drive wheel means.

10. An aerating machine according to claim 9 wherein said control means includes means for pivotally mounting said control lever on said frame for movement between said first, second, third, and fourth positions, and linkage means interconnecting the control lever with said first, second, and third clutches for selective and coordinated operation of said clutches in response to movement of said lever, said linkage means including first, second, and third actuator levers respectively and operably connected to said first, second, and third clutches for controlling the operation of said clutches, a belt crank pivotally mounted on said frame and pivotally connected at one end to said control lever, a first link connecting the other end of said bell crank to said first actuator lever, means pivotally connecting said first link with said first actuator lever, a second link connecting said first actuator lever with said second actuator lever, said second link including a lost motion connection, means pivotally connecting said second link with said first actuator lever and with said second actuator lever, a third link connecting said first actuator lever to said third actuator lever, and means pivotally connecting said third link with said actuator lever and with said third actuator lever.

11. An aerating machine comprising a frame, a pair of ground-engaging wheels supporting said frame, a drive shaft journaled on said frame and adapted to be rotated by a source of power, a plurality of tines movably mounted on said frame, a crankshaft mounted on said frame and operably connected to said tines for driving said tines vertically in response to rotation of said crankshaft, a camshaft journaled on said frame and operably connected to said tines for moving said tines horizontally in response to rotation of said camshaft, a first clutch operably connected between said drive shaft and said wheels for selectively engaging and disengaging said drive shaft to and from said wheels, a second clutch operably connected between said drive shaft and each of said crankshaft and said camshaft for selectively engaging and disengaging said drive shaft to and from said crankshaft and said camshaft, a third clutch operably connected between said wheels and one of said crankshaft and said camshaft for selectively engaging and disengaging said wheels to said one of said crankshaft and said camshaft, and means mounted on said frame and connected to said first, second, and third clutches and including a single control lever for selectively controlling the operation of said first, second and third clutches and having first, second, third and fourth spaced positions such that said first clutch is engaged and said second and third clutches are disengaged when said control lever is in said first position, such that said first, second, and third clutches are disengaged when said lever is in said second position, such that said second clutch is engaged and said first and third clutches are disengaged when said control lever is in said third position, and such that said second and third clutches are engaged and said first clutch is disengaged when said lever is in said fourth position.

* * * * *